United States Patent [19]

Takagi

[11] 4,403,976
[45] Sep. 13, 1983

[54] CLUTCH FOR BELT DRIVE
[75] Inventor: Izumi Takagi, Akashi, Japan
[73] Assignee: Kawasaki Jukogyo Kabushiki Kaisha, Kobe, Japan
[21] Appl. No.: 159,411
[22] Filed: Jun. 13, 1980
(Under 37 CFR 1.47)
[30] Foreign Application Priority Data
Jun. 13, 1979 [JP] Japan ................... 54-74898
[51] Int. Cl.³ ............................ F16H 55/56
[52] U.S. Cl. ..................................... 474/19
[58] Field of Search ................ 474/19, 20, 21
[56] References Cited
U.S. PATENT DOCUMENTS 3,534,622 10/1970 Johnson ....................... 474/19 X
3,599,504 8/1971 Taylor ......................... 474/15 X
3,881,370 5/1975 Vogelaar et al. ............. 474/19 X
3,967,509 7/1976 Teal .............................. 474/19
4,033,195 7/1977 Takagi ......................... 474/19

*Primary Examiner*—Allan D. Herrmann
*Attorney, Agent, or Firm*—Merriam, Marshall & Bicknell

[57] ABSTRACT

This disclosure relates to a clutch for a belt drive. The clutch includes a first sheave secured to a driven shaft, a second sheave on the shaft adjacent the first sheave but rotatable and axially movable relative to the first sheave and to the shaft. The two sheaves form an annular outer space for receiving a driving belt, and an annular inner enclosed space which receives a cam mechanism and a spring. The cam mechanism and the spring are connected to the two sheaves and adjust the width of the annular outer space in response to various drive conditions.

4 Claims, 11 Drawing Figures

CLUTCH FOR BELT DRIVE

This invention relates to a V-belt type automatic transmission of the type widely used in small and lightweight vehicles such as small cars, golf carts, agricultural vehicles, snowmobiles and the like. A V-belt type automatic transmission of this type generally comprises a drive clutch connected to the drive or output shaft of an engine or motor, a driven clutch connected to a driven shaft, and a V-belt interconnecting both clutches in driving relation. Each clutch includes a fixed sheave secured to the respective shaft and a movable sheave on the shaft. The function of the transmission is to transfer rotational power produced by the engine to the driven shaft and to automatically perform the necessary torque conversion.

The transmission is adapted so that, when the rotational speed of the engine is low, the space between the sheaves of the driving clutch is relatively wide and the space of the driven clutch is relatively narrow. This allows the V-belt to run around the sheaves of the driving clutch at a reduced radius and around the driven sheaves at a greater radius, thereby transferring the rotational power from the driving clutch to the driven clutch at a greater ratio of the driven torque to the driving torque. As the rotational speed of the engine increases, a centrifugal, springy, hydraulic or pneumatic sheave thrust control mechanism provided in each of the clutches allows the movable sheave of the driving clutch to move toward the fixed sheave and allows the movable sheave of the driven clutch to move away from the fixed sheave, thus transmitting the rotational power with a reduced ratio of the driven torque to the driving torque.

In addition to the above described power transmission, the automatic torque conversion is made by a pressure adjusting cam directly responsive to changes in load on the driven shaft to automatically adjust the torque ratio, or by a feed-back system responsive to boost pressures of the engine or to other values, to hydraulically or pneumatically operate a torque ratio adjusting mechanism.

With current engines having higher speed and power output, a lighter, smaller and safer transmission is desirable. It has also become desirable to have the torque conversion characteristics easily changed or adjusted.

It is therefore a general object of this invention to provide a safe, small, lightweight and simple driven clutch for a V-belt type automatic transmission, wherein the torque conversion characteristics may be easily adjusted.

The details of this invention will become apparent from the following detailed description of preferred embodiments of the invention, which are non-restrictive, illustrative examples of the invention, taken in conjunction with the accompanying figures of the drawings, wherein.

Figures 1, 9A, 9B, 9C:
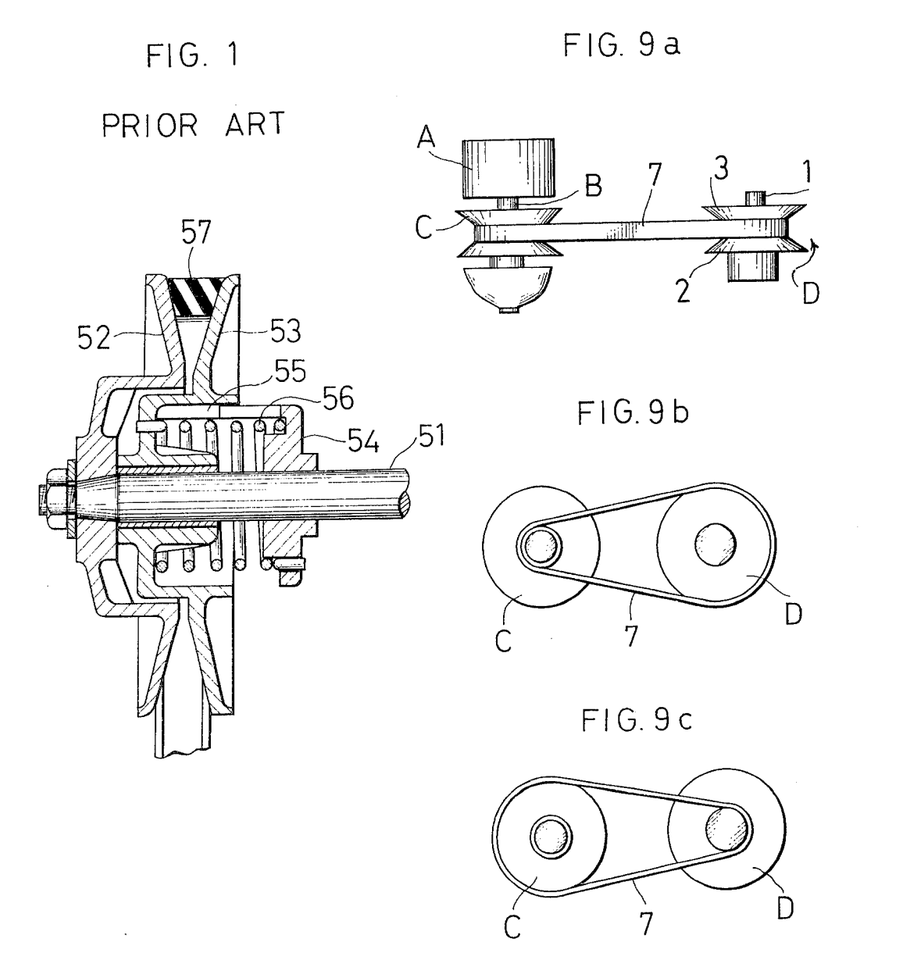
FIG. 1 is an axial sectional view of prior art apparatus.
FIGS. 9a to 9c are schematic views illustrating the operation of a drive system according to this invention.

A conventional driven clutch is shown in FIG. 1, and comprises a driven shaft 51, a fixed sheave 52 secured to one end of the shaft 51, a movable sheave 53 mounted on the shaft 51 on one side of the sheave 52 and, together with the fixed sheave 52, forming a V-shaped annular space, a cam bracket 54 secured to the shaft 51 at the outer side of the movable sheave 53, a cam mechanism 55 provided between the cam bracket 54 and the movable sheave 53, and a compression spring 56 between the sheave 53 and the bracket 54. The spring 56 urges the movable sheave 53 toward the fixed sheave 52 so that both sheaves are in axially compressive and frictional engagement with a driven V-belt 57 in the annular space, thus transmitting the rotational power from the belt to the shaft. In this construction, the cam mechanism 55 is recessed into the side of the movable sheave 53 and the cam bracket 54 is exposed, so that parts of the cam mechanism 55 and the bracket 54 may be thrown automatically if the clutch breaks. Also, the belt load is applied through the sheaves to the end portion of the shaft 51 which is far from the shaft supports, exerting large bending moments on the shaft.

U.S. Pat. No. 4,033,195 discloses a clutch which is designed to eliminate such dangers and includes a movable sheave, a fixed sheave, a cam mechanism, and a compression and torsion spring having a number of purposes, among them to urge the movable sheave toward the fixed sheave. This clutch is complex and axially enlarged because of the necessity to provide a minimum axial length for the spring when it is most expanded.

Reference is now made to FIGS. 2-5 for the first embodiment of the present invention.

Figure 2:
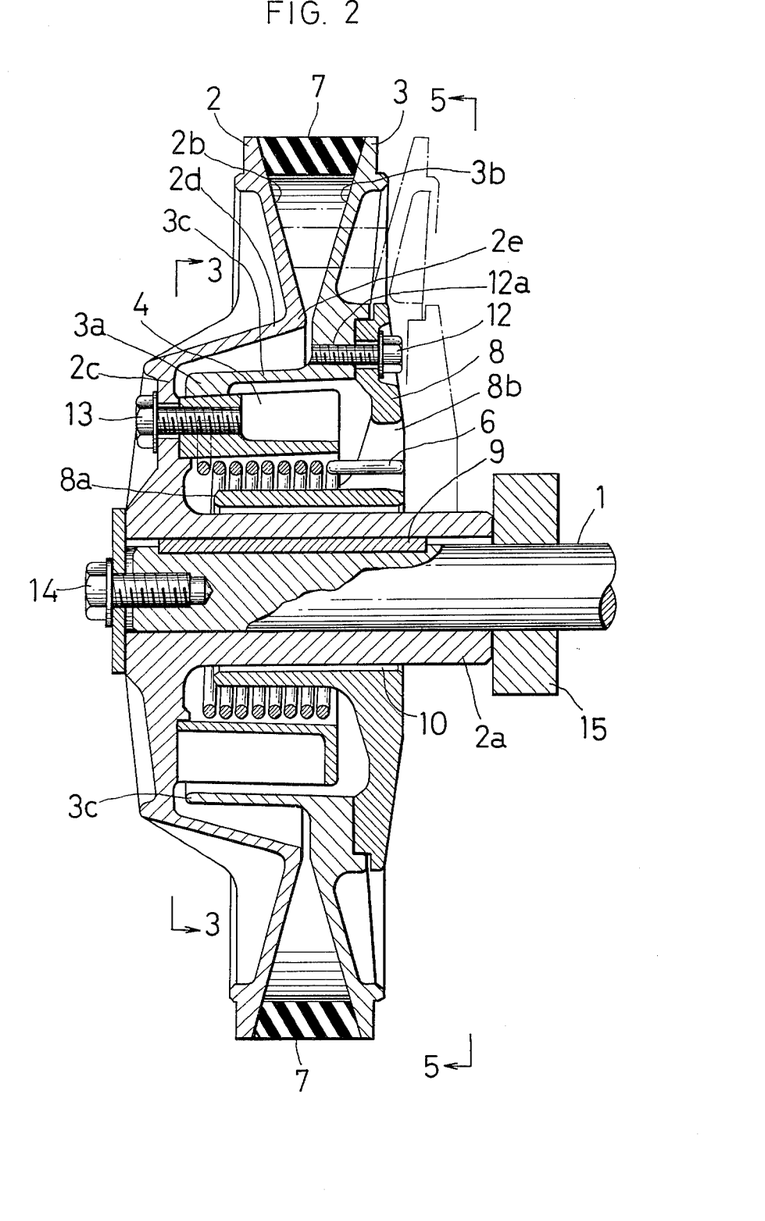
FIG. 2 is an axial sectional view showing a first embodiment of this invention.

A driven clutch is adapted to be mounted on a shaft 1 to be driven, the shaft being supported by a bearing 15 on a housing (not shown) or the like. The clutch includes a fixed sheave 2 secured to one end of the shaft 1 by a bolt 14 and having a central tubular hub 2a that extends axially inwardly toward the center of the shaft 1. The hub 2a is fixed to the shaft 1 by a key 9. A slide sheave 3 is mounted coaxially with and adjacent the fixed sheave 2. Secured to the sheave 3 as by bolts 12 is a radial flange 8 and a central sleeve 8a that extends around the hub 2a and toward the fixed sheave 2. A bushing 10 is attached to the inner side of the sleeve 8a for a sliding and turning fit with the sleeve 2a. The flange 8 and the sleeve 8a may be formed integrally if desired.

The sheaves 2 and 3 have peripheral, inner surfaces 2b and 3b, rspectively, which face each other and are inclined radially outwardly to form a diverging annular space that is V-shaped in section. The space is adapted to receive a V-belt 7 that runs in frictional engagement with the peripheral surfaces 2b and 3b in order to drive the sheaves 2 and 3.

The fixed sheave 2 further has a central, generally radial wall 2c extending outwardly from the hub 2a, and a conical wall 2d extending between the radial wall 2c and the peripheral wall 2b, the wall 2d diverging somewhat axially inwardly and radially spaced from the sleeve 8a. The border or corner 2e between the conical wall 2d and peripheral wall 2b is adjacent to the lower edge of the peripheral wall 3b of the slide sheave 3.

The slide sheave 3 includes a sleeve or cylindrical portion 3c extending toward the fixed sheave 2 radially within and adjacent the conical wall 2d and spaced radially outwardly from the sleeve 8a.

Figures 3, 4:
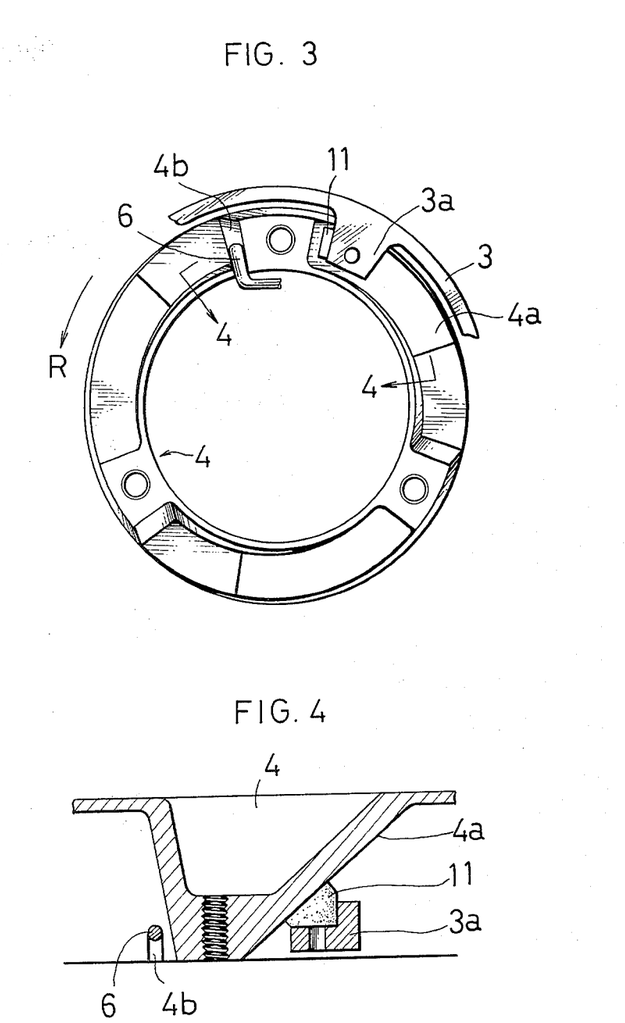
FIG. 3 is a view of parts of FIG. 2 taken on the line 3—3 in FIG. 2.
FIG. 4 is an enlarged fragmentary sectional view taken on line 4—4 of FIG. 3.

The clutch further comprises a generally annular cam bracket 4, best shown in FIG. 3, which is secured to the radial wall 2c of the fixed sheave 2 by bolts 13. The bracket 4 is surrounded by the sheaves 2 and 3 and the flange 8, and more specifically by the radial wall 2c, the conical wall 2d, the sleeve 3c and the flange 8. The cam bracket 4 has preferably a number of cam surfaces 4a (FIGS. 3 and 4) facing the radial wall 2c of the fixed sheave 2 and gradually rising in the direction as shown by an arrow R (FIG. 3) in which to rotate the clutch.

The sleeve 3c of the slide sheave 3 has radially inward projections 3a (see FIGS. 3 and 4) at the inner end of the sleeve 3c, and a bushing 11 is secured to each extension 3a, as best shown in FIG. 4, to slide on one of the cam surfaces 4a. As the bushings 11 move up or down the cam surfaces, the axial space between the two sheaves changes.

A tension and twist or torsion spring 6 is mounted between the cam bracket 4 and the sleeve 8a and its ends are anchored in a cut-out 4b (FIG. 4) of the bracket 4 and in an axial hole 8b (FIGS. 2 and 5) of the flange 8 to urge the slide sheave 3 toward the fixed sheave 2. The slide sheave 3 is also angularly biased by the torsion of the spring 6 in the direction R (FIG. 3) so that the bushings 11 of the sheave 3 compressively engage the cam surfaces 4a, allowing rotational power to be transmitted from the slide sheave 3 to the fixed sheave as both sheaves are driven by the belt 7 in the direction R. The rotational power is transmitted from the fixed sheave 2 to the shaft 1 through the key 9.

This angular bias on the movable or slide sheave 3 allows the bushings 11 to tend to climb up the cam surfaces 4a, which urges the movable sheave 3 toward the fixed sheave 2.

Figure 6:
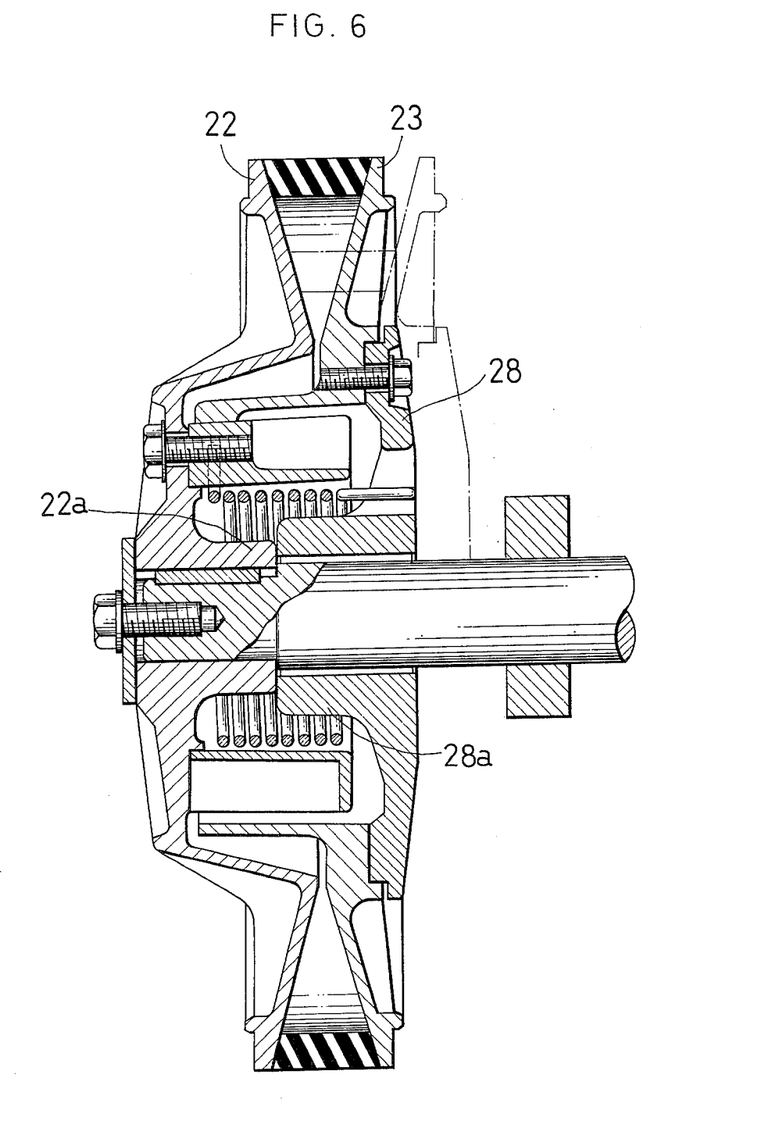
FIG. 6 is an axial sectional view showing a second embodiment of this invention.

The second embodiment is shown in FIG. 6. The central sleeve 22a of the fixed sheave 22 is shorter than that of the sleeve 2a first embodiment, and the sleeve 28a of the flange 28 is also shorter than the corresponding sleeve 2a, and it is mounted slidably and turnably around the shaft 1. The movement of the movable or slide sheave 23 toward the fixed sheave 22 is limited by engagement of the adjacent ends of the sleeves 22a and 28a, as is shown by the position of the parts in FIG. 6.

Figure 7:
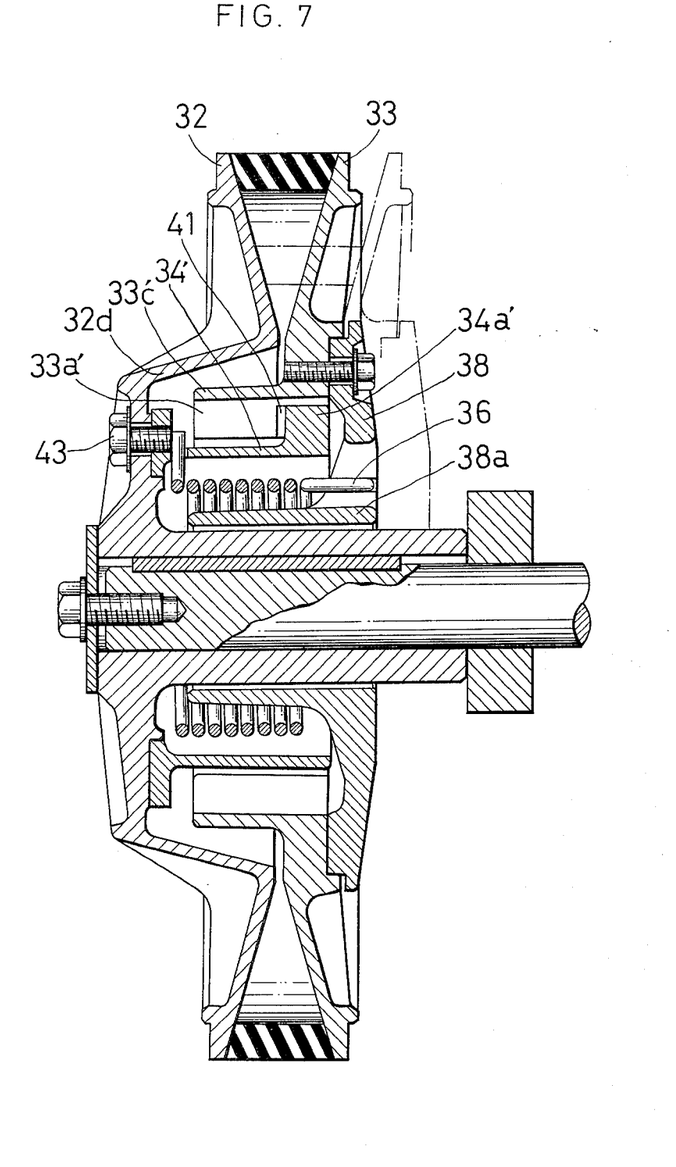
FIG. 7 is an axial sectional view showing a third embodiment thereof.
Figure 8:
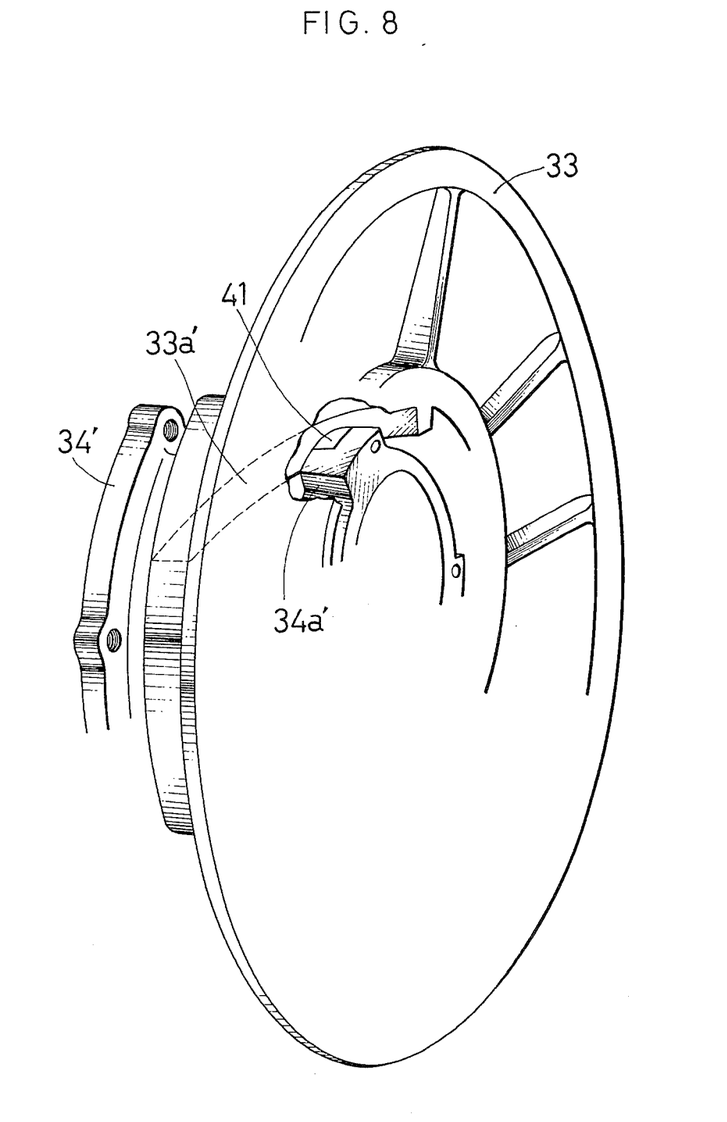
FIG. 8 is a fragmentary, perspective view of the apparatus shown in FIG. 7.

The third embodiment is shown in FIGS. 7 and 8, where the provision of the cam surfaces and the bushings is reversed. The movable sheave 33 has an annular extension 33c' extending toward the fixed sheave 32 and is radially outwardly spaced from the sleeve 38a and is adjacent to the conical wall 32d of the fixed sheave 32. The annular extension 33c' is formed with cam surfaces 33a' similar to the surfaces 4a in FIGS. 3 and 4 but they face the flange 38. A cylindrical counter bracket 34' is bolted at 43 to the fixed sheave 32 and extends toward the flange 38 between the axial extension 33c' and sleeve 38a. The bracket 34' has a plurality of radially outwardly extending projections 34a', to each of which is attached a bushing 41 that slides on one of the cam surfaces 33a'. A twist and compression spring 36 is provided between the bracket 34' and sleeve 38a, similarly to the previous embodiments.

The operation of the embodiment shown in FIGS. 1 to 5 is illustrated in connection with FIGS. 9a, 9b and 9c. Rotational power is transmitted from an engine A through a centrifugal shaft B, a driving clutch C, the belt 7 and the driven clutch D to the driven shaft 1. As the rotational speed of the engine becomes higher, the belt 7 tends to run around the driving clutch C at a greater radius (FIG. 9c) due to centrifugal force. This will cause the belt 7 to run around the driven clutch D at a reduced radius, forcing the movable sheave 3 away from the fixed sheave 2 against the tensile and torsional forces of the spring 6, as the bushings 11 slide on the cam surfaces 4a in FIGS. 1 to 5. As a result, torque conversion is produced at both clutches C and D with the balance of thrust between the movable sheaves of the clutches.

Figure 5:
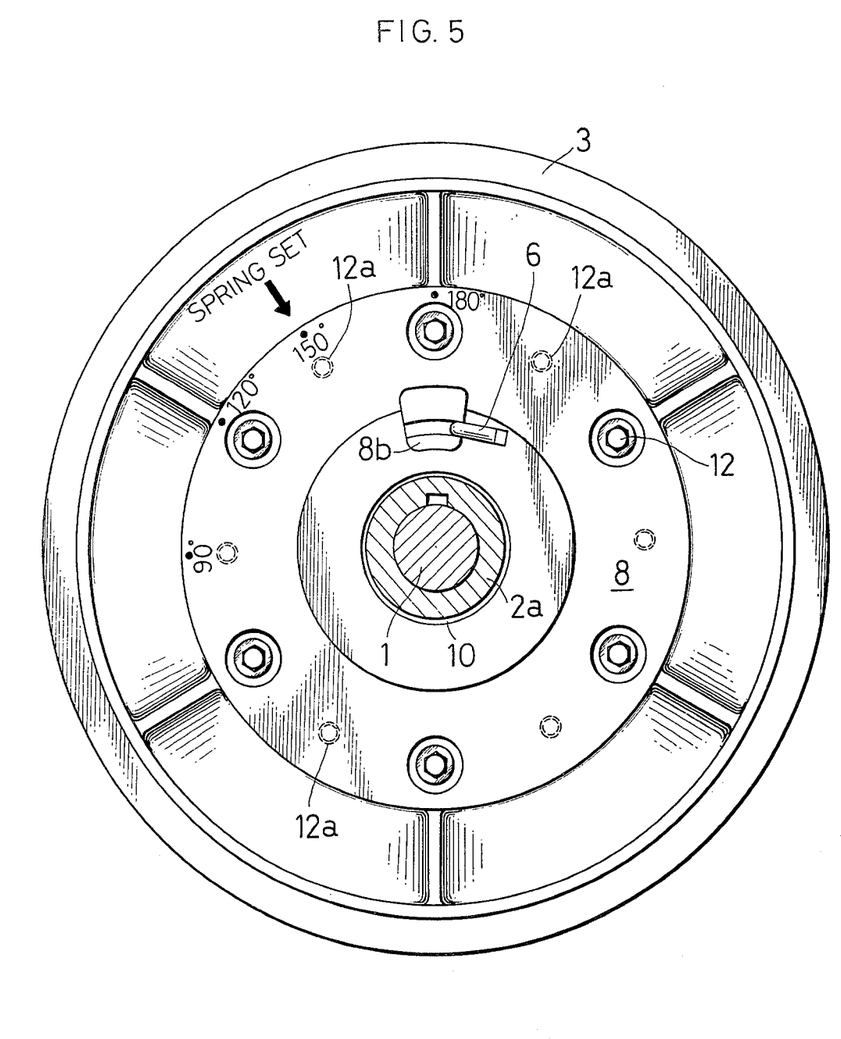
FIG. 5 is a sectional view taken on line 5—5 of FIG. 2.

The torque conversion can be adjusted by changing the angular position of the flange 8 relative to the movable sheave 3. In the present example, a plurality of angularly spaced holes 12a for the bolts 12 are formed in the flange 8. The bolts 12 are located at 60° intervals whereas the holes 12a are provided at 30° intervals, so that the flange 8 may be adjusted by steps of 30° by removing the bolts 12 and rethreading in different flange holes 12a to adjust the tortional force of the spring 6. The angle of the adjusted torsion may be indicated on the outer side of the flange 8 by a scale and pointer as shown in FIG. 5. If it is not desired to be able to adjust the torsion of the spring, the flange 8 may be constructed integrally with the sheave 3.

The cam mechanism and the spring mechanism are surrounded by the two sheaves 2 and 3 and the flange 8 is not exposed as in prior art arrangements, thus minimizing damage thereto. Even if such mechanisms are broken, the parts thereof will not fly out. The use of a tension and torsion spring 6 makes the clutch compact and axially short and light.

U.S. Pat. Nos. 3,534,622 and 3,599,504 show transmissions of the kind wherein a compression and torsion spring is surrounded by the back side of a fixed or movable sheave and an extension from either sheave as the case may be. Such an arrangement requires space for at least the axial length for the spring when most contracted and the stroke of the movable sheave, resulting in an excessively axially size.

In the arrangements shown in U.S. Pat. Nos. 4,033,195, 3,534,622 and 3,599,504, an adjustment of torque conversion requires disassembling the parts including the cam mechanism in order to change the torsion of the spring.

What is claimed is:

1. A driven clutch for a V-belt type automatic transmission adapted to be mounted on a rotatable shaft, said clutch comprising a fixed sheave adapted to be secured to said shaft, a movable sheave including a flange, said sheave and said flange being movable axially and rotatable relative to said shaft, said sheaves together forming an annular space therebetween for receiving a belt, said sheaves and flange forming another annular substantially enclosed space, cam means connected between said sheaves and including at least one cam surface for providing driving engagement between said sheaves and for changing the width of said annular space between said sheaves, and tension and torsion spring means connecting said sheaves for urging said movable sheave toward said fixed sheave and for angularly biasing said movable sheave relative to said fixed sheave so as to be urged through said cam means toward said fixed sheave, both said spring means and cam means being located within said annular enclosed space.

2. A clutch as in claim 1, wherein said cam surface is formed on an annular bracket secured to said fixed sheave, and said movable sheave has a sleeve extending toward said fixed sheave, said sleeve having at least one radial projection engaging said cam surface.

3. A clutch as in claim 1, wherein said cam surface is formed in an annular extension from said movable sheave, and an annular bracket that is secured to said fixed sheave and extends toward said movable sheave has at least one radial projection that engages said cam surface.

4. A clutch as in claim 1, wherein said flange is detachably secured to said movable sheave, whereby the angular position of said flange relative to said movable sheave may be changed to adjust the torsion of said spring means.

* * * * *